United States Patent [19]
Roth

[11] 3,772,143
[45] Nov. 13, 1973

[54] METHOD OF SIZING PAPER WITH A SULPHONIUM RESIN COPOLYMER

[75] Inventor: Harold H. Roth, Bay City, Mich.

[73] Assignee: The Dow Chemical Company, Midland, Mich.

[22] Filed: Oct. 2, 1970

[21] Appl. No.: 77,746

[52] U.S. Cl.............. 162/169, 162/168, 260/79.3, 260/79.7
[51] Int. Cl........................ D21d 3/00, D21h 3/38
[58] Field of Search.......................... 162/168, 169; 260/79.3 MU, 79.7

[56] References Cited
UNITED STATES PATENTS
3,335,100  8/1967  Geyer .................................. 162/168
3,130,117  4/1964  Humiston........................... 162/168
3,216,979  11/1965  Sexsmith ..................... 260/79.3 MU
2,895,925  7/1959  Hwa................................. 260/79.7

*Primary Examiner*—Robert L. Lindsay, Jr.
*Assistant Examiner*—Arthur L. Corbin
*Attorney*—Griswold and Burdick, D. H. Thurston and Richard W. Hummer

[57] ABSTRACT

Paper is effectively sized by incorporating a small quantity of a water-soluble sulfonium resin copolymer of 65-90 mole percent vinylbenzyl chloride-thiodiethanol adduct units and 35-10 mole percent of

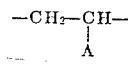

wherein A is hydrogen, a lower alkyl group, a phenyl group or a tolyl group.

6 Claims, No Drawings

METHOD OF SIZING PAPER WITH A SULPHONIUM RESIN COPOLYMER

BACKGROUND OF THE INVENTION

The present invention relates to a method for sizing paper and to paper treated by this method.

The most commonly used sizes for paper at present are wax emulsions, which must be formulated so as to have a cationic charge, and complexes of alum and rosin which require an acid pH in the papermaking pulp suspension to which they are added. These materials are added to paper pulp suspensions in the papermaking process to add body and finish to the paper and primarily to make the paper more resistant to water and less permeable to ink. In some cases, sizing can also be applied to the dry paper sheet formed from the pulp suspension.

SUMMARY OF THE INVENTION

Certain water-soluble sulfonium resins have now been found to be effective sizes for paper which avoid some of the disadvantages characteristic of present commercial materials. These resins are inherently cationically charged, are effective at neutral pH, and are easily controlled in the sizing process because of their solubility in water. These sulfonium resins have a molecular structure consisting essentially of 65–90 mole percent of randomly recurring units having the structure (a) 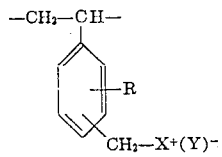

wherein

R is hydrogen or a methyl group, X represents a bis(hydroxyalkyl)sulfide moiety

wherein R' and R'' are hydroxyalkyl groups of one to three carbon atoms, and Y is an anion such as chloride, bromide, iodide, sulfate, nitrate, phosphate, carbonate, or acetate, and 35–10 mole percent of units having the structure (b) 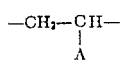

wherein A is hydrogen, an alkyl group of one to four carbon atoms, a phenyl group, or a tolyl group.

These sulfonium resins are preferably added to an aqueous suspension of cellulosic fiber in a quantity to provide about 0.05 to about 2 percent of resin based on the fiber content. The resin can be added to the headbox, beater, or at another appropriate point in the papermaking process. Alternatively, an aqueous solution of the resin can be added to the dry paper sheet in like amount after the sheet has been formed from a paper pulp suspension. In either case, the resin-containing paper is cured at 50°–150° C to fix the resin in the paper and to obtain its sizing properties.

DETAILED DESCRIPTION

Preferably, the structure (a) above is that of the vinylbenzyl chloride-2,2'-thiodiethanol adduct wherein R is hydrogen, X is the thiodiethanol moiety, Y is a chloride anion, and structure (b) above is styrene.

This preferred structure can be prepared by any convenient method, one such procedure comprising copolymerizing styrene and vinylbenzyl chloride by solution or emulsion polymerization in the presence of a free radical initiator such as actinic light, an azo catalyst, or a peroxide and reacting the copolymer with 2,2'-thiodiethanol. Alternatively, the vinylbenzyl chloride-thiodiethanol adduct monomer can first be made and then this sulfonium monomer can be copolymerized with styrene. Still another method for arriving at the defined sulfonium resin structure comprises chloromethylating polystyrene and reacting the partially chloromethylated product with the thiodiethanol.

Other sulfonium polymer structures included by the broad description above are made by similar methods using homologous or analogous reactants.

The molecular weight of the sulfonium resin is not critical to its effectiveness as a paper size. Essentially linear polymers having an average molecular weight of about 10,000 up to several million are operable so long as they remain soluble in water.

As defined above, the sized paper can contain about 0.05–2 percent of resin based on the weight of paper. Preferably, about 0.1–0.5 percent of resin is employed.

The curing time for the treated paper is also not critical although increased curing time provides increased resistance to permeation by water or ink up to a point. Curing times normally run from one minute to several hours, up to about 20 hours, for example, depending upon the temperature, the quantity of resin present and the degree of sizing desired.

EXAMPLES 1–2

Sulfonium resins were prepared by polymerizing vinylbenzyl chloride with and without styrene in the presence of a vinyl polymerization catalyst in an aqueous emulsion and stirring a mixture of the polymer latex thereby obtained with excess 2,2'-thiodiethanol at room temperature for 12 days. The reaction product was diluted with water to a concentration of 10 percent active resin solids.

Strips of untreated, calendered bleached softwood sulfite paper were saturated by dipping in a 0.2 percent solution of the sulfonium resin to leave 0.2 percent resin in the dried paper. The paper strips were dried and cured at 110° C for varying lengths of time. On each cured strip of paper, several drops of blue-black ink were spaced apart on the surface and the underside was examined periodically to determine the time for about half of the area under each drop to be darkened by breakthrough of the ink. The times for the individual drops on each strip were averaged to give an approximate but reasonably reproducible value indicating the extent of sizing of the paper. Results of these tests using various sulfonium resins and a control test with no resin sizing are listed in the table. Tests A, B, and C illustrate the unfavorable results obtained when operating outside the scope of the invention.

| Example No. | Sulfonium sizing agent | Minutes to 50% breakthrough of ink | | |
|---|---|---|---|---|
| | | 3 min. cure | 2 hr. cure | 15 hr. cure |
| A | None | Less than one second | | |
| B | 100% VBC [1] | 0.05 | 0.15 | 0.75 |
| 1 | 80% VBC-20% S [2] | 0.75 | 5 | 15 |
| 2 | 70% VBC-30% S [3] | 1 | 5 | 14 |
| C | 60% VBC-40% S [4] | 0.05 | | 0.5 |

[1] 2,2'-thiodiethanol adduct of 36,000 mol. wt. homopolymer of vinylbenzyl chloride.
[2] 2,2'-thiodiethanol adduct of 50,000 mol. wt. copolymer of 80 mole percent vinylbenzyl chloride and 20 mole percent styrene.
[3] 2,2'-thiodiethanol adduct of 55,000 mol. wt. copolymer of 70 mole percent vinylbenzyl chloride and 30 mole percent styrene.
[4] 2,2'-thiodiethanol adduct of 65,000 mol. wt. copolymer of 60 mole percent vinylbenzyl chloride and 40 mole percent styrene.

I claim:

1. A method for sizing paper which comprises adding to cellulosic paper fiber about 0.05 to about 2 percent based on the weight of fiber of a sulfonium resin of which the molecular structure consists essentially of randomly recurring units of the structure (a) 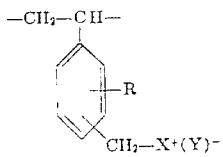

wherein
R is hydrogen or a methyl group,
X is R'SR'' wherein each of R' and R'' is a hydroxyalkyl group of one to three carbon atoms, and Y is an anion of the group chloride, bromide, iodide, carbonate, acetate, phosphate, nitrate, and sulfate, said units comprising 65–90 mole percent of the total units in the resin structure and the remainder of the units in the resin structure have the formula (b) 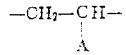

wherein A is hydrogen, a lower alkyl group, a phenyl group, or a tolyl group, and curing the treated fiber at 50°–150° C.

2. The method of claim 1 whrein the sulfonium resin is added to the cellulosic paper fiber in an aqueous papermaking fiber suspension.

3. The method of claim 1 wherein the sulfonium resin is added as an aqueous solution to a paper sheet.

4. The method of claim 1 wherein in unit (a), R is hydrogen, X represents a 2,2'-thiodiethanol moiety, and Y is a chloride anion, and in unit (b), A is a phenyl group.

5. The method of claim 4 wherein the sulfonium resin is used in a quantity of 0.1–0.5 percent.

6. Paper sized by the method of claim 1.

* * * * *